United States Patent [19]

Harden et al.

[11] Patent Number: 5,274,219

[45] Date of Patent: Dec. 28, 1993

[54] HANDHELD LASER SCANNER WITH BUILT-IN STAND

[75] Inventors: Daniel K. Harden; Barbara H. Sauceda, both of Palo Alto, Calif.; Brad R. Reddersen, Eugene, Oreg.; Christopher Lenart, Oakland, Calif.

[73] Assignee: Spectra-Physcis Scanning System, Inc., Eugene, Oreg.

[21] Appl. No.: 711,539

[22] Filed: Jun. 10, 1991

[51] Int. Cl.$^5$ .............................................. G06K 7/10
[52] U.S. Cl. .................................. 235/462; 235/472
[58] Field of Search ................. 235/462, 472; 362/190

[56] References Cited

U.S. PATENT DOCUMENTS

| | | | |
|---|---|---|---|
| 4,282,425 | 8/1981 | Chadima et al. | 235/462 |
| 4,739,457 | 4/1988 | Orr | 362/190 |
| 5,059,778 | 10/1991 | Zouzoulas et al. | 235/472 |
| 5,075,538 | 12/1991 | Swartz et al. | 235/472 |
| 5,140,141 | 8/1992 | Inagaki et al. | 235/462 |

Primary Examiner—John W. Shepperd
Attorney, Agent, or Firm—Lyon & Lyon

[57] ABSTRACT

A scanner constructed so that it includes a built-in stand which allows it to sit generally upright on a table when not held in the hand. The scanner can be programmed to automatically scan labels without needing to actuate the trigger, so that when it is set on the table in its "standing" position it can act as a "hands free" scanner. The scanner also includes aiming markings to make it easier for the user to intuitively aim the scanner at bar codes.

5 Claims, 1 Drawing Sheet

HANDHELD LASER SCANNER WITH BUILT-IN STAND

BACKGROUND OF THE INVENTION

The field of the present invention relates to scanners and more particularly to handheld laser scanners.

A laser scanner is used for the purpose of non-contact reading of bar codes, emits a scanning line of laser light from an opening on the scanner, and can be used either held in the hand or free-standing on the table, without the use of any other stand devices. The scanner includes a protective housing which incorporates all electronics, optics, light sources, and scanning mechanisms necessary to generate the scanning beam of light, detect the light scattered by the bar code, convert the detected light energy into a digital bit stream, decode the digital information and turn it into a valid bar code, and communicate that information to a data terminal. The scanner is constructed so that it includes a built-in stand which allows it to sit generally upright on a table when not held in the hand. The scanner can be programmed to automatically scan labels without needing to actuate the trigger, so that when it is set on the table in its "standing" position it can act as a "hands free" scanner. The scanner also includes aiming markings to make it easier for the user to intuitively aim the scanner at bar codes.

DESCRIPTION OF THE PREFERRED EMBODIMENTS

This invention relates to laser scanning systems which can be held in the hand or set on a table to operate in a "hands free" mode.

More particularly, invention relates to a new type of handheld laser scanner, with features to make it easier for the scanner user to set the scanner down on a table when not in use, as well as to allow the scanner to operate in a "hands free" mode without the need for special electro-mechanical "smart stands" that are currently used in the industry. The scanner also includes special means to help the user more intuitively aim the scanner at bar codes.

In one embodiment of the invention, the scanner housing described below will enclose the following parts: a laser light source such as a visible laser diode, a focussing means for the light source, a scanning means for the light source, a means of relaying the scanning beam away from the scanner housing so that it hits a target bar code, a means of collecting the light energy scattered by the bar code, a means of converting that light energy into an analog electronic signal representative of the bar code, a means of converting that analog electronic signal into a digital bit stream, a means of translating the digital bit stream into valid bar code information, a means of formatting the bar code data so that it may be understood properly by a data terminal, a means of communicating with a data terminal, and a means of transmitting the scanned bar code data to the data terminal.

Figure 1:
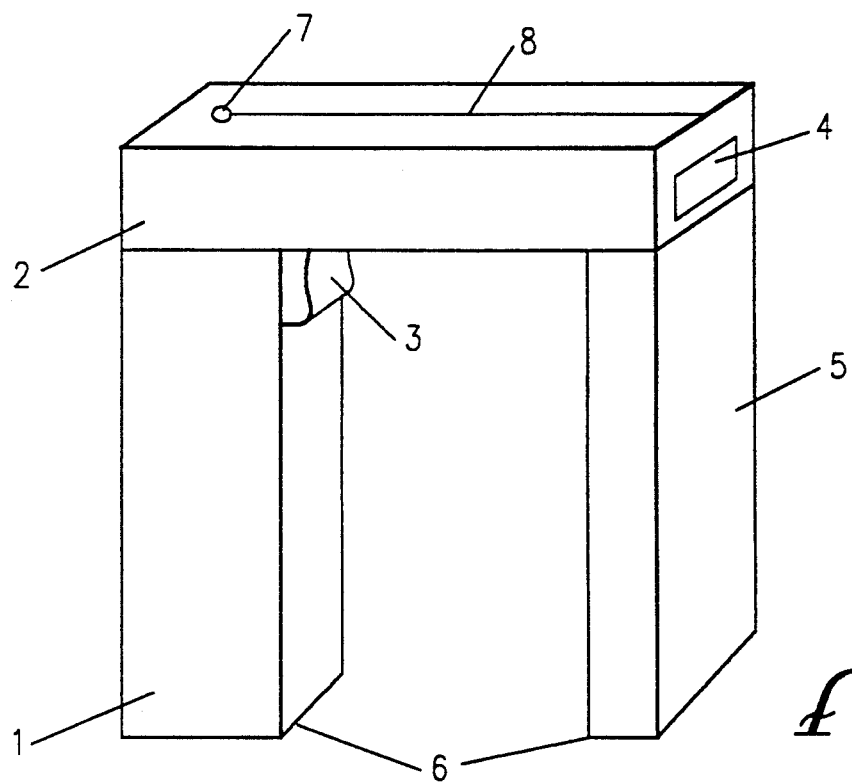
FIG. 1 illustrates a first embodiment of the invention.

One embodiment of this invention is shown in FIG. 1. The scanner includes a handle 1 which allows the user to support the scanner in his or her hand in the "hand held" mode of operation. A top portion 2 of the scanner, when combined with handle 1 and a trigger 3, forms the traditional "gun shape" of traditional handheld scanners. Trigger 3, when activated, activates all electronics inside the scanner, so that the laser turns on, the scanning mechanism is set in motion, and all analog detection and digital processing electronics are activated. When the laser is turned on, the output scanning beams exit from transparent scanning window 4, and the light scattered from the bar code during the scanning process is also collected through transparent scanning window 4.

A stand portion 5 can also be built into the scanner. This stand portion, shown in FIG. 1 as a rectangular-shaped stand positioned under transparent scanning window 4, can be built into the scanner so that top portion 2, handle 1, and stand portion 5 are all one part. It is also possible to have stand portion 5 be a detachable or interchangeable unit with a variety of purposes.

The bottom of handle 1 and stand portion 5 are designed so that the scanner can rest stably on resting points 6 on stand portion 5 or suitable resting points on other table-like structures.

Such standing scanners can either be operated so that a user must pull the trigger to activate scanning, or the can be used in a "hands free" mode. In this second mode of operation, a user can activate a special button on the scanner, or pass a special programming bar code in front of the scanner, so that it operates in a "continuous scanning" mode even when the trigger is not actuated. If desired, the scanner can also be designed so that the "continuous scan" mode would be disabled the moment the scanner was picked up and trigger 3 pushed again.

FIG. 1 also indicates the positioning of an LED indicator 7 on the top of top portion 2 of stand portion 5. This indicator could glow amber when the laser beam is on and glow momentarily green when the scanner has successfully decoded a label. Aiming line 8 is a line painted, molded, or silk-screened on the top of the scanner so that one end of the mark is centered over the center of the transparent scanning window, and the other end of the mark is connected to LED indicator 7. Aiming line 8 allows the scanner operator to more intuitively aim the scanner at bar codes during the reading process.

Figure 2:
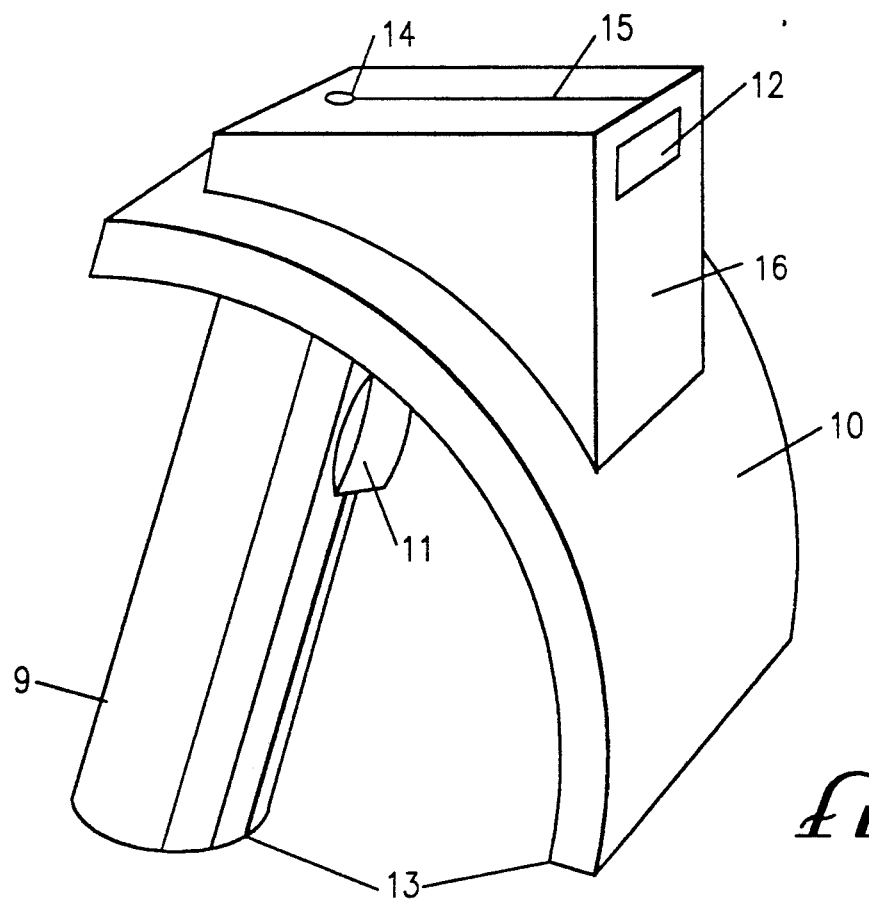
FIG. 2 illustrates a second embodiment of the invention.

A second version of a scanner with a built-in stand is shown in FIG. 2. In this version handle 9 and trigger 11 perform similar functions to handle 1 and trigger 3, respectively, of the scanner shown in FIG. 1. A curved stand and electronics housing 10 now forms part of the stand, so that it and handle 9 can sit comfortably on a table on resting points 13. A trapezoidal head 16 includes transparent scanning window 12; this window 12 works in much the same manner as window 4 in the scanner of FIG. 1. Finally, LED Indicator 14 and aiming line 15 provide the same features as provided by the LED indicator 7 and aiming line 8, respectively, in FIG. 1.

In the scanner shown in both figures, there is no restriction on where the various internal functional parts of the scanner need to be located. In more traditional handheld scanners, for example, a handle such as handle 1 or handle 9 might have included the decoding and interfacing electronics. For ease of manufacture and possible upgrades by users, however, stand portion 5 or curved stand and electronics housing 10 could be used to house either decoding or interface electronics if desired.

One feature of the present invention is to provide a built-in stand for a handheld laser scanner, so that the scanner can just as easily be used in a "hands free" mode as it is as a "hand held" scanner.

A second feature of the present invention is to provide a handheld scanner with a built-in stand that can operate without the need for triggering the device manually.

A third feature of the present invention is to provide additional places to locate additional electronics and optical subsystems for the product, to aid with ease of upgradeability and manufacturing options for the product.

A fourth feature of the present invention is to provide additional aiming devices for a laser scanner, through the use of an aiming line and an LED indicator.

We claim:

1. A handheld laser scanner comprising: a handle and trigger configured to allow easy supporting and triggering of said scanner when it is held in the hand, said scanner also including a built-in stand so that it can rest on a table and still allow said scanner's laser beam to be used to scan objects while said scanner rests on the table.

2. A handheld laser scanner as described in claim 1 wherein said built-in stand is rectangular in cross section and shape.

3. A handheld laser scanner as described in claim 1 wherein said built-in stand is curved.

4. A handheld laser scanner as described in claim 1 wherein said scanner can be programmed or otherwise switched on so that it will continuously scan labels presented to it, even without pulling said trigger.

5. In an aiming system for a handheld laser scanner, the improvement which comprises including in said aiming system an LED indicator light and a line running from said indicator light in the direction of scanning.

* * * * *